(12) United States Patent
Nishikuma

(10) Patent No.: US 11,557,931 B2
(45) Date of Patent: Jan. 17, 2023

(54) STATOR WITH DUAL JIG ARRANGEMENT

(71) Applicant: TOYOTA JIDOSHA KABUSHIKI KAISHA, Toyota (JP)

(72) Inventor: Yasushi Nishikuma, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 310 days.

(21) Appl. No.: 16/905,226

(22) Filed: Jun. 18, 2020

(65) Prior Publication Data

US 2020/0321819 A1    Oct. 8, 2020

Related U.S. Application Data

(63) Continuation of application No. 15/914,443, filed on Mar. 7, 2018, now abandoned.

(30) Foreign Application Priority Data

Mar. 10, 2017    (JP) .................... 2017-046464

(51) Int. Cl.

| H02K 3/12 | (2006.01) |
|---|---|
| H02K 15/085 | (2006.01) |
| H02K 3/14 | (2006.01) |
| B21D 11/20 | (2006.01) |
| H02K 1/16 | (2006.01) |
| H02K 3/48 | (2006.01) |
| H02K 15/00 | (2006.01) |

(52) U.S. Cl.
CPC ............. *H02K 3/12* (2013.01); *B21D 11/20* (2013.01); *H02K 1/16* (2013.01); *H02K 3/14* (2013.01); *H02K 3/48* (2013.01); *H02K 15/0056* (2013.01); *H02K 15/085* (2013.01)

(58) Field of Classification Search
CPC .. B21D 11/20; H02K 15/0056; H02K 15/085; H02K 1/16; H02K 3/12; H02K 3/14
See application file for complete search history.

(56) References Cited

U.S. PATENT DOCUMENTS

| 5,936,326 A | 8/1999 | Umeda |
| 6,181,043 B1 | 1/2001 | Kusase |
| 6,201,332 B1 | 3/2001 | Umeda |
| 6,501,206 B2 | 12/2002 | Oohashi |
| 6,834,422 B2 | 12/2004 | Kato |
| 6,894,415 B2 | 5/2005 | Koike |

(Continued)

FOREIGN PATENT DOCUMENTS

| CN | 105914912 A | 8/2016 |
| JP | 2004-173403 A | 6/2004 |

(Continued)

*Primary Examiner* — Minh N Trinh
(74) *Attorney, Agent, or Firm* — Sughrue Mion, PLLC

(57) ABSTRACT

A stator for a rotary electric machine includes a stator coil configured such that a tip end of a conductor segment bent in a stator circumferential direction is joined to a tip end of another conductor segment in the same phase. A conductive material is exposed from the tip ends of the conductor segments, and a distance between the tip ends in different phases and adjacent to each other in the stator circumferential direction is larger than a distance between the tip ends in the same phase and adjacent to each other in the stator circumferential direction.

4 Claims, 8 Drawing Sheets

(56) References Cited

U.S. PATENT DOCUMENTS

| | | |
|---|---|---|
| 7,287,311 B2 | 10/2007 | Ichikawa |
| 8,093,778 B2 | 1/2012 | Schmid |
| 8,499,438 B2 | 8/2013 | Agapiou |
| 8,555,694 B2 * | 10/2013 | Saito ........................ B21F 1/00 |
| | | 72/380 |
| 8,772,995 B2 | 7/2014 | Ogihara |
| 2002/0017825 A1 | 2/2002 | Oohashi |
| 2003/0135980 A1 | 7/2003 | Ichikawa |
| 2010/0194229 A1 | 8/2010 | Schmid |
| 2012/0133235 A1 | 5/2012 | Ogihara |
| 2016/0248291 A1 | 8/2016 | Tamura |
| 2019/0214874 A1 | 7/2019 | Hashimoto |
| 2020/0321819 A1 * | 10/2020 | Nishikuma ............... H02K 3/14 |
| 2022/0352796 A1 * | 11/2022 | Uchiyama ............ H02K 15/066 |

FOREIGN PATENT DOCUMENTS

| | | |
|---|---|---|
| JP | 2006-136082 A | 5/2006 |
| JP | 2014-007795 A | 1/2014 |

* cited by examiner

STATOR WITH DUAL JIG ARRANGEMENT

INCORPORATION BY REFERENCE

This application is a continuation of U.S. application Ser. No. 15/914,443, filed Mar. 7, 2018, which claims priority to Japanese Patent Application No. 2017-046464 filed on Mar. 10, 2017 each of which is incorporated herein by reference in its entirety.

BACKGROUND

1. Technical Field

The present disclosure relates to a stator for a rotary electric machine and a manufacturing apparatus thereof, and particularly to a stator for a rotary electric machine including a stator coil configured such that a tip end of a conductor segment projecting from a slot of a stator core is joined to a tip end of another conductor segment in the same phase.

2. Description of Related Art

There is a segment coil as a stator coil wound around a stator core of a rotary electric machine. The segment coil is configured such that a conductor segment made of a flat lead wire bent in a U-shape is inserted into a slot of a stator core, and a part projecting from the slot is bent in a stator circumferential direction, so as to be joined by welding to a tip end of another conductor segment, for example.

Surfaces of the conductor segments are covered with insulating coatings, and at the time of welding, the insulating coatings of the tip ends of the conductor segments to be joined are removed. The tip ends (conductor exposed parts) where the insulating coatings are removed are joined to each other by welding by TIG arc welding (Tungsten Inert Gas welding) or laser irradiation (e.g., see Japanese Patent Application Publication No. 2014-007795 (JP 2014-007795 A)).

SUMMARY

In recent years, a rotary electric machine has been downsized, and a diameter of a stator core including segment coils tends to be reduced. When the diameter of the stator core is reduced, a joining part (a tip end) of a conductor segment forming a segment coil and a joining part of its adjacent conductor segment in a different phase is shortened, which makes it difficult to secure an insulating property between the joining parts.

Particularly, like a stator described in JP 2014-007795 A, in a case of a segment coil having a structure in which linear parts of conductor segments are eliminated and intersecting parts of the conductor segments are joined to each other by laser irradiation, a creepage distance between joining parts of the conductor segments are short, which makes it difficult to secure the insulating property.

Further, it is also conceivable that the joining parts of the conductor segments are coated with insulation resin. However, a step of insulating the joining parts after welding is required and an insulation resin material to coat the joining parts is also required, which increases costs.

In view of this, the present disclosure improves an insulating property of joining parts of conductor segments in a stator including a segment coil.

A first aspect of the present disclosure relates to a stator for a rotary electric machine. The stator includes: a stator core including slots provided at a plurality of positions in a circumferential direction, and a stator coil configured such that a tip end of a conductor segment projecting from a stator-core axial end of each of the slots and bent in the circumferential direction of the stator core is joined to a tip end of another conductor segment in the same phase. A conductive material is exposed from the tip ends of the conductor segments, and a distance between the tip ends in different phases and adjacent to each other in the circumferential direction of the stator core is larger than a distance between the tip ends in the same phase and adjacent to each other in the circumferential direction of the stator core.

With the above configuration, in the stator including a segment coil, it is possible to improve an insulating property between joining ends of the conductor segments.

In the stator for the rotary electric machine, a distance between the conductor segments in different phases and adjacent to each other in the circumferential direction of the stator core may be larger than a distance between the conductor segments in the same phase and adjacent to each other in the circumferential direction of the stator core.

A second aspect of the present disclosure relates to a manufacturing apparatus for a stator for a rotary electric machine. The manufacturing apparatus includes a jig configured to bend, in a stator-core circumferential direction, conductor segments projecting from stator-core axial end surfaces of slots provided in a stator core. The jig includes a first jig configured to bend one conductor segment out of the conductor segments in the same phase and adjacent to each other in the stator-core circumferential direction, and a second jig configured to bend the other conductor segment. The second jig is configured to bend the other conductor segment such that a tip end of the other conductor segment approaches a tip end of the one conductor segment at a time when the first jig bends the one conductor segment.

In the manufacturing apparatus for the stator for the rotary electric machine, the first jig may include a protrusion configured to bend the one conductor segment. The protrusion may include a tilting surface configured to abut with the tip end of the one conductor segment and to tilt and bend the one conductor segment in the circumferential direction, and a position defining surface configured to define a position of the tip end of the one conductor segment after the one conductor segment is bent.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A configuration of a stator 20 for a rotary electric machine is described with reference to the drawings. Note that, in the following description, an "axial direction," a "circumferential direction," and a "radial direction" indicate an axial direction, a circumferential direction, and a radial direction of the stator 20 for the rotary electric machine.

Figure 1:
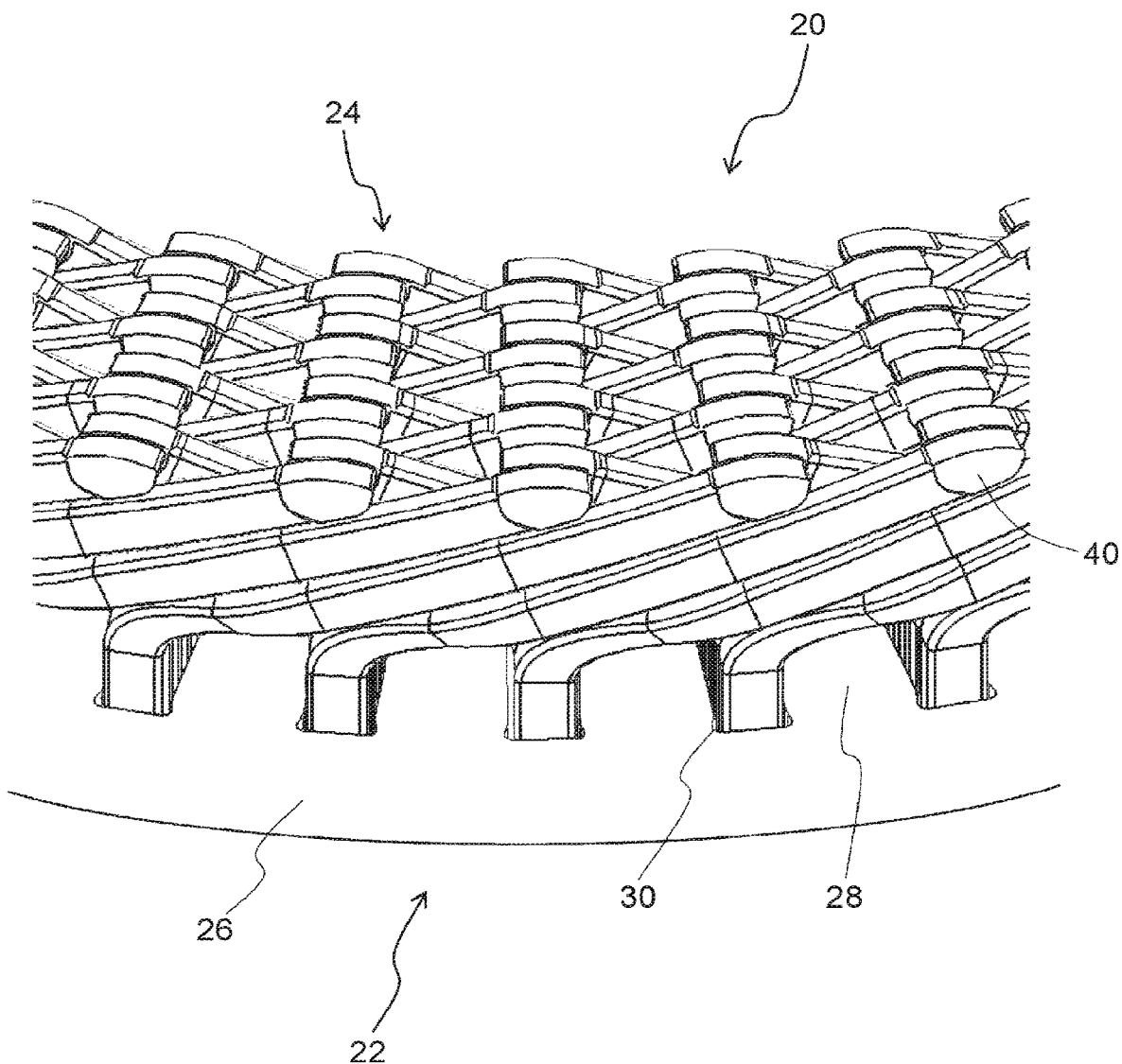
FIG. 1 is an enlarged perspective view around a coil end of a stator for a rotary electric machine.

As illustrated in FIG. 1, the stator 20 for the rotary electric machine includes a stator core 22 and a stator coil 24. The stator core 22 is configured such that a plurality of electromagnetic steel sheets is laminated in an axial direction. The stator core 22 includes a generally cylindrical yoke 26, and a plurality of teeth 28 projecting radially inward from an inner peripheral edge of the yoke 26. The plurality of teeth 28 is disposed at regular intervals in the circumferential direction, and a slot 30, which is a space where the stator coil 24 is placed, is formed between two adjacent teeth 28.

The stator coil 24 includes a U-phase coil, a V-phase coil, and a W-phase coil. The stator coil 24 is configured as a segment coil, and the segment coil is configured such that a plurality of conductor segments 32 is joined to each other.

Figure 2:
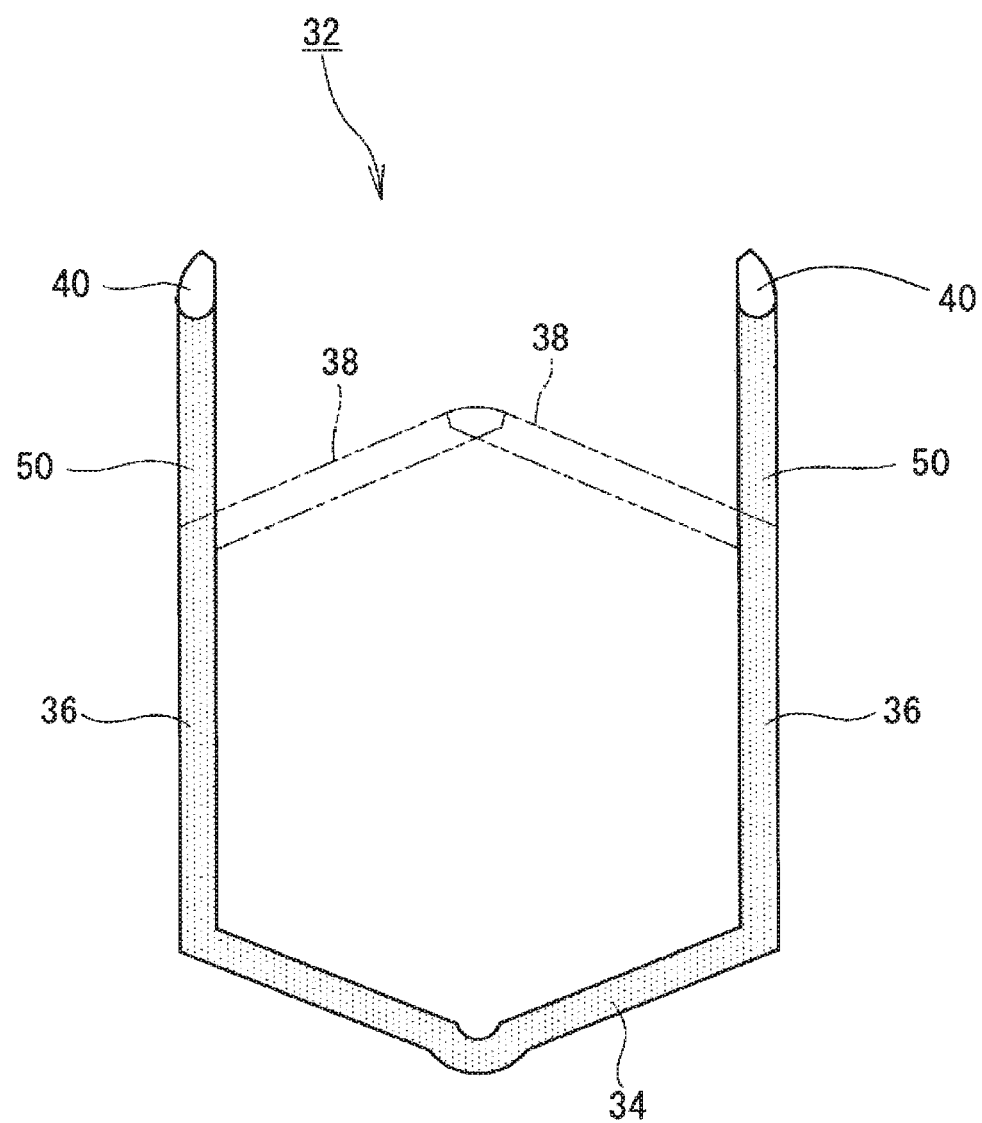
FIG. 2 is a schematic front view of a conductor segment before assembling to a stator core.

FIG. 2 illustrates one conductor segment 32 before assembling to the stator core 22. As illustrated in FIG. 2, the conductor segment 32 is formed such that a flat conductive material having a generally rectangular section and coated with insulation resin is bent generally in a U-shape. At a stage before the assembling to the stator core 22, the conductor segment 32 includes a pair of linear parts 50, and a connecting pan 34 that connects the pair of linear parts 50 to each other.

At the time when the conductor segment 32 is assembled to the stator core 22, the pair of linear parts 50 are inserted into respective slots 30. Hereby, the connecting part 34 extends in the circumferential direction so as to cross a plurality of teeth 28 on a second axial end side of the stator core 22. Further, tip ends 40 of the linear parts 50 are inserted into the slots 30 and then bent in the circumferential direction in a middle thereof as indicated by an alternate long and two short dashes line in FIG. 2. Hereby, the linear parts 50 become leg parts 36 extending in the axial direction inside the slots 30, and bridge parts 38 extending in the circumferential direction on a first axial end side of the stator core 22.

The conductor segment 32 is coated with the insulation resin as described above, but the insulation resin is removed only from the tip ends 40 of the linear parts 50. This is to secure electrical connection with other conductor segments 32. The tip ends 40 are joined to each other by welding or the like. This joining will be described later.

Figure 3:
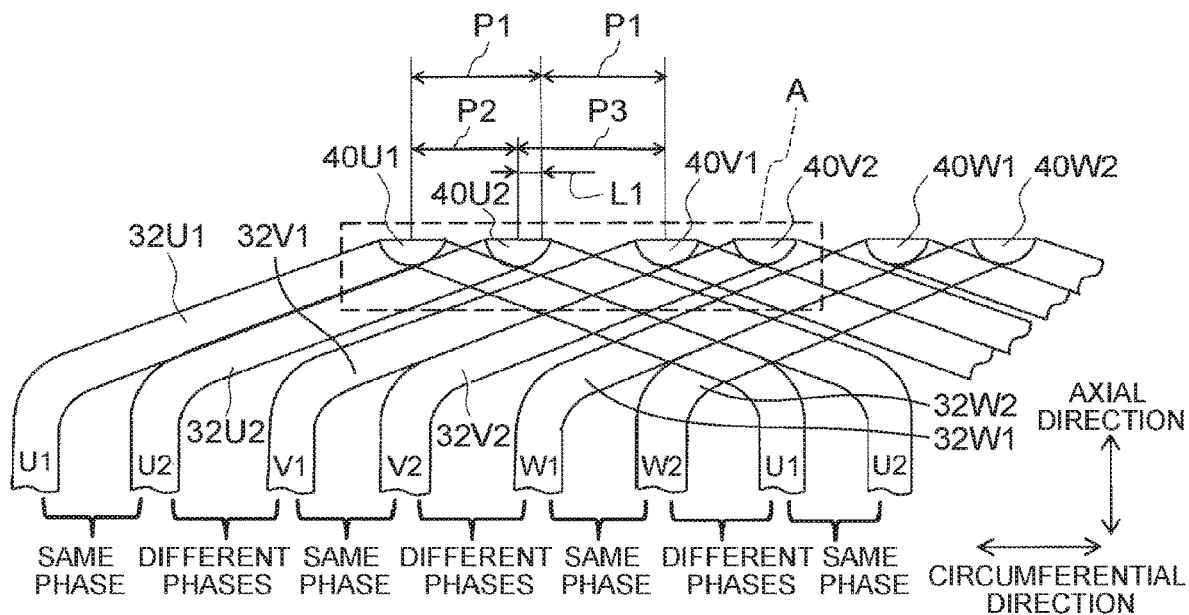
FIG. 3 is a schematic view of a segment coil to describe an arrangement relationship of joining parts of conductor segments in each phase.
Figure 4:
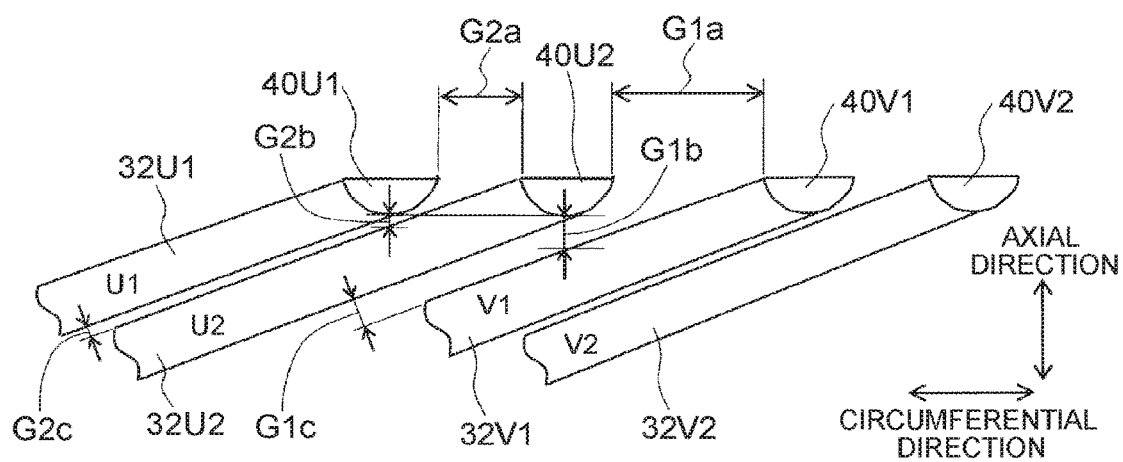
FIG. 4 is an enlarged view of a part A in FIG. 3.

Next will be described an arrangement of the conductor segments 32 and the tip ends 40 with reference to FIGS. 3 and 4. FIG. 3 schematically illustrates an arrangement relationship of the tip ends 40 of the conductor segments 32 in a coil end, and FIG. 4 is an enlarged view of a part A in FIG. 3. The enlarged view of the part A illustrates tip ends 40 of a U1-phase, a U2-phase, a V1-phase, and a V2-phase. Note that, in FIGS. 3 and 4, a reference sign of a corresponding phase is assigned to each conductor segment 32 and each tip end 40.

As illustrated in FIG. 3, the conductor segments 32 are placed repeatedly in an order of the U1-phase, the U2-phase, the V1-phase, the V2-phase, a W1-phase, and a W2-phase in the circumferential direction. As illustrated in FIG. 4, a tip-end distance G1$a$ between tip ends 40U2, 40V1 in different phases (e.g., the U2-phase and the V1-phase) and adjacent to each other in the circumferential direction is larger than a tip-end distance G2$a$ between tip ends 40U1, 40U2 in the same phase (the U1-phase and the U2-phase) and adjacent to each other in the circumferential direction. That is, a relationship of the tip-end distance G1$a$ in different phases>the tip-end distance G2$a$ in the same phase is established.

Further, a conductor-segment distance G1$b$ in the axial direction between conductor segments 32U2, 32V1 in different phases (e.g., the U2-phase and the V1-phase) and adjacent to each other in the circumferential direction is larger than a conductor-segment distance G2$b$ in the axial direction between conductor segments 32U1, 32U2 in the same phase (e.g., the U1-phase and the U2-phase) and adjacent to each other in the circumferential direction. That is, a relationship of the conductor-segment distance G1$b$ in different phases>the conductor-segment distance G2$b$ in the same phase is satisfied. Further, a conductor-segment distance G1$c$ indifferent phases in an orthogonal direction to surfaces of the conductor segments 32 is larger than a conductor-segment distance G2$c$ in the same phase.

Referring back to FIG. 3, as a method for defining sizes of the tip-end distances G1$a$, G2$a$ and the conductor-segment distances G1$b$, G1$c$, G2$b$, G2$c$, at the time of bending the conductor segment 32U2, a position of the tip end 40U2 of the conductor segment 32U2 is adjusted so that the tip end 40U2 of the conductor segment 32U2 approaches the tip end 40U1 of the conductor segment 32U1.

That is, tip ends of conductor segments in the related art are placed at regular intervals (at a distance P1), but in the present embodiment, the conductor segment 32U2 is bent so that the tip end 40U2 approaches the tip end 40U1, that is, a distance between the tip end 40U2 and the tip end 40U1 in the same phase is a distance P2 (P2<P1), which is smaller than the distance P1. On this account, a distance between the tip end 40U2 and the tip end 40V1 in different phases is a distance P3 (P3>P1), which is larger than the distance P1. Further, a distance by which the tip end 40U2 approaches the tip end 40U1 is a distance L1 (=P1−P2). The distance L1 is set based on a specification of the conductor segment 32U2 or the tip end 40U2 appropriately. As a result, the distance P3>the distance P2 is established, so that the relationship of the tip-end distance G1$a$>the tip-end distance G2$a$ is established.

Further, similarly, in terms of tip ends 40V2, 40W2 of conductor segments 32V2, 32W2, positions of the tip ends 40V2, 40W2 are adjusted at the time of bending the conductor segments 32V2, 32W2. Note that a specific position adjustment of the tip ends 40U2, 40V2, 40W2 will be described later.

Figure 5:
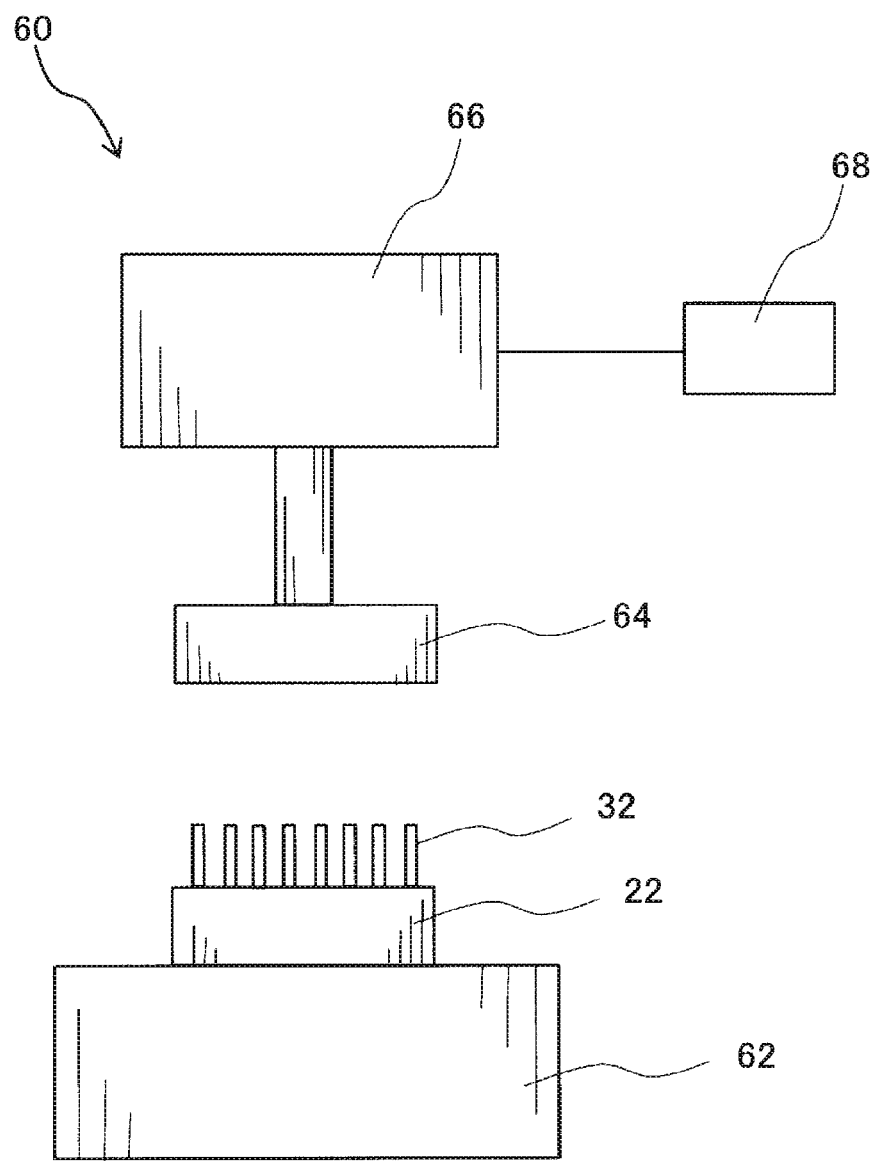
FIG. 5 is a schematic configuration diagram of a bending device for bending conductor segments.

Next will be described the bending of the conductor segments 32 and the position adjustment of the tip ends 40 at the time of the bending with reference to FIGS. 5 to 8. FIG. 5 illustrates a schematic configuration of a bending device 60 for bending the conductor segments 32. As illustrated in FIG. 5, the bending device 60 includes: a stator core fixing portion 62 configured to fix the stator core 22 in which the conductor segments 32 are inserted into the slots 30; an annular jig 64 configured to bend the conductor segment 32; a jig holding portion 66 configured to rotate the jig 64 and move the jig 64 up and down in the axial direction; and a controlling portion 68 configured to control operations of the stator core fixing portion 62, the jig 64, and the jig holding portion 66.

Note that the configuration of the bending device 60 other than the jig 64 is similar to a configuration of a well-known bending device (see Japanese Patent Application Publication No. 2006-136082 (JP 2006-136082 A)), and therefore, a description thereof is omitted. The following specifically describes the jig 64 configured to bend the conductor segments 32.

Figure 6:
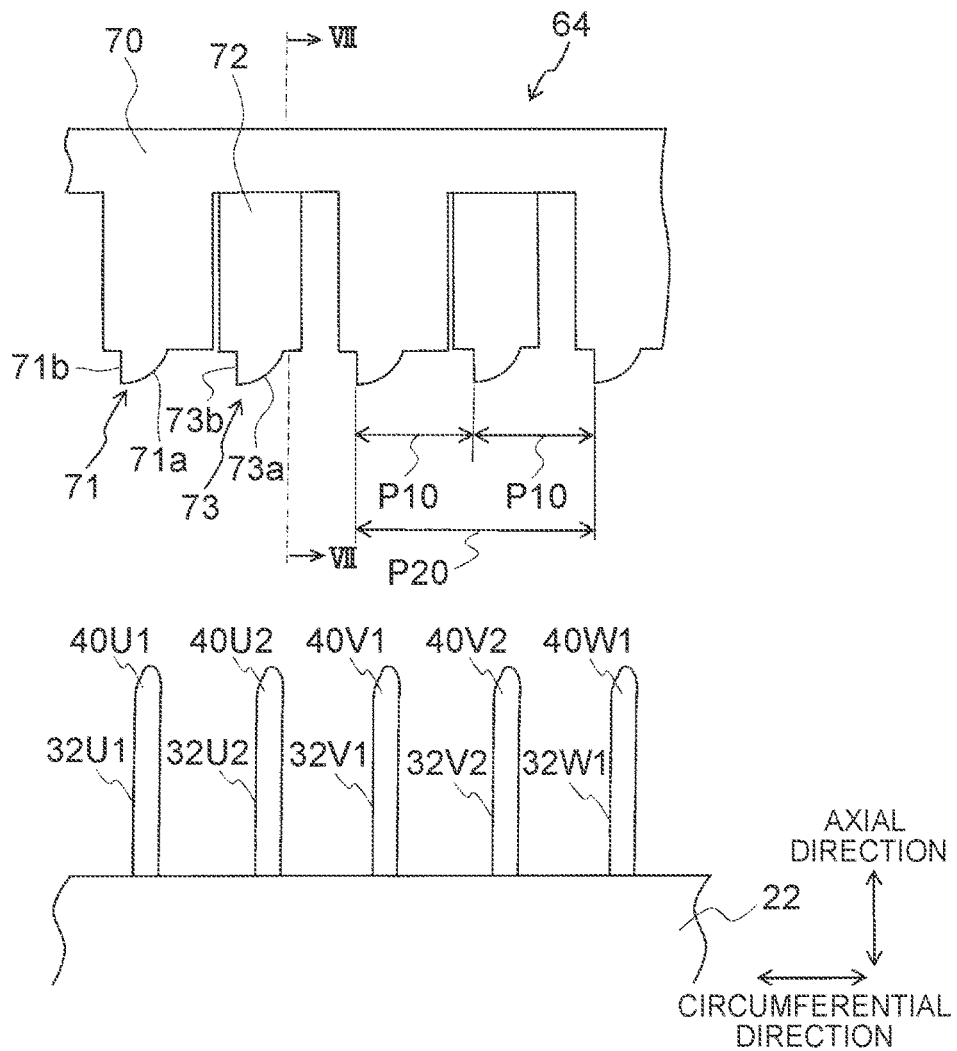
FIG. 6 is a partially enlarged view of a jig of the bending device and is a drawing illustrating an arrangement relationship between the jig and the stator core.

FIG. 6 is a partial enlarged view when the jig 64 is viewed from a side surface. As illustrated in FIG. 6, the jig 64 includes a first jig 70 configured to bend the conductor segments 32U1, 32V1, 32W1, and a second jig 72 configured to bend the conductor segments 32U2, 32V2, 32W2. The first jig 70 includes protrusions 71 configured to bend the conductor segments 32U1, 32V1, 32W1. The protrusions 71 are disposed at distances P20 corresponding to arrangement positions of the conductor segments 32U1, 32V1, 32W1. The distance P20 is twice as large as a distance P10, and the distance P10 is the same distance as the distance P1 illustrated in FIG. 3. Further, the protrusion 71 includes: a tilting surface 71a configured to abut with the tip end 40 of the conductor segment 32 and to tilt and bend the conductor segment 32 in the circumferential direction; and a position defining surface 71b configured to define a position of the tip end 40 of the conductor segment 32 after the conductor segment 32 is bent.

Figure 7:
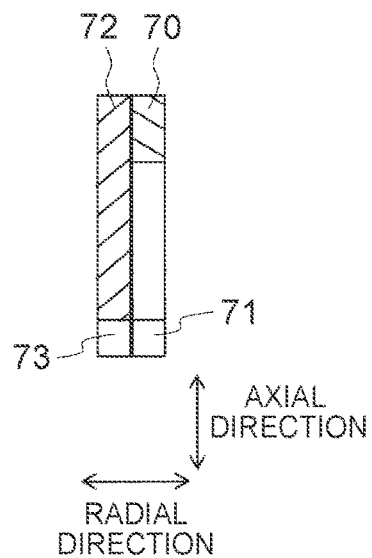
FIG. 7 is a sectional view taken along a line VII-VII of FIG. 6.

The second jig 72 has an annular shape having a diameter smaller than the first jig 70, and is disposed inside the first jig 70. As illustrated in FIG. 7, an inner peripheral surface of the first jig 70 slidably makes contact with an outer peripheral surface of the second jig 72. Further, the second jig 72 has a shape similar to the first jig 70. Protrusions 73 of the second jig 72 are disposed so as to correspond to arrangement positions of the conductor segments 32U2, 32V2, 32W2. A disposition distance is the same as the protrusions 71, and the protrusions 73 are disposed at the distances P20. The distance P20 is twice as large as the distance P10, and the distance P10 is the same distance as the distance P1 illustrated in FIG. 3. On this account, the protrusions 71, 73 are disposed at the same distance P10 as the distance P1 illustrated in FIG. 3.

The jig holding portion 66 that holds the first jig 70 and the second jig 72 includes respective actuators configured to rotationally drive the first jig 70 and the second jig 72, so as to rotationally drive the first jig 70 and the second jig 72, individually. These actuators are controlled by the controlling portion 68, and can reversely rotate the second jig 72 after the rotation of the first jig 70, or can stop the rotation of the second jig 72 during the rotation of the first jig 70, for example. Note that operations of the first jig 70 and the second jig 72 will be describe later more specifically.

Figure 8:
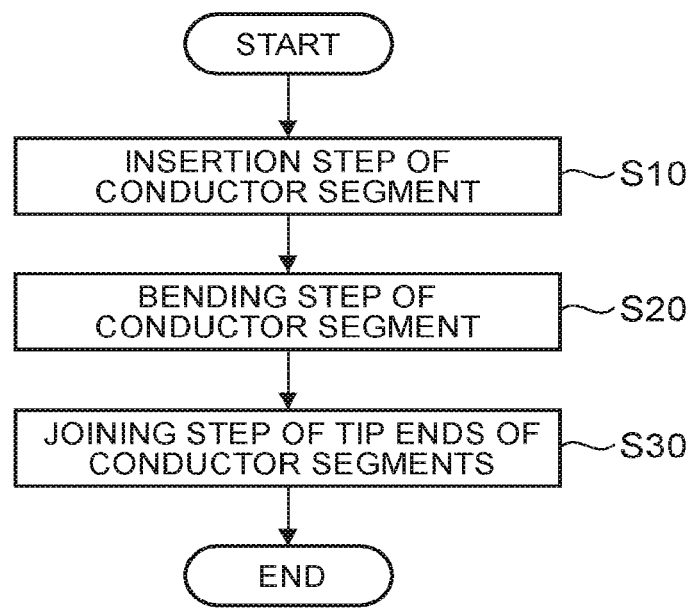
FIG. 8 is a flowchart to describe a manufacturing method of a stator.

Next will be described a manufacturing process of the stator 20 with reference to FIG. 8. A manufacturing apparatus for manufacturing the stator 20 includes: an insertion device configured to insert the conductor segments 32 into the stator core 22; the bending device 60 configured to bend the conductor segments 32 projecting from the slots 30; and a welding device configured to join the tip ends 40 of the bent conductor segments 32 thus bent. As illustrated in FIG. 8, the manufacture of the stator 20 includes: an insertion step (step S10) of inserting the conductor segments 32 into the slots 30 of the stator core 22; a bending step (step S20) of bending the conductor segments 32 projecting from the slots 30, following the insertion step; and a joining step (step S30) of joining the tip ends 40 of the conductor segments 32 thus bent.

In step S10, the conductor segments 32 illustrated in FIG. 2 are inserted into the slots 30 of the stator core 22 from the first axial end side. After the conductor segments 32 are inserted into all the slots 30, the stator core 22 is carried into the bending device 60.

In step S20, the stator core 22 carried into the bending device 60 is fixed with the stator core fixing portion 62. After the fixation of the stator core 22, the jig 64 is moved down, and the protrusions 71 of the first jig 70 and the protrusions 73 of the second jig 72 are brought into contact with the tip ends 40 of their corresponding conductor segments 32. From this state, the first jig 70 and the second jig 72 are moved down and rotated so as to tilt and bend the conductor segments 32.

Figure 9:
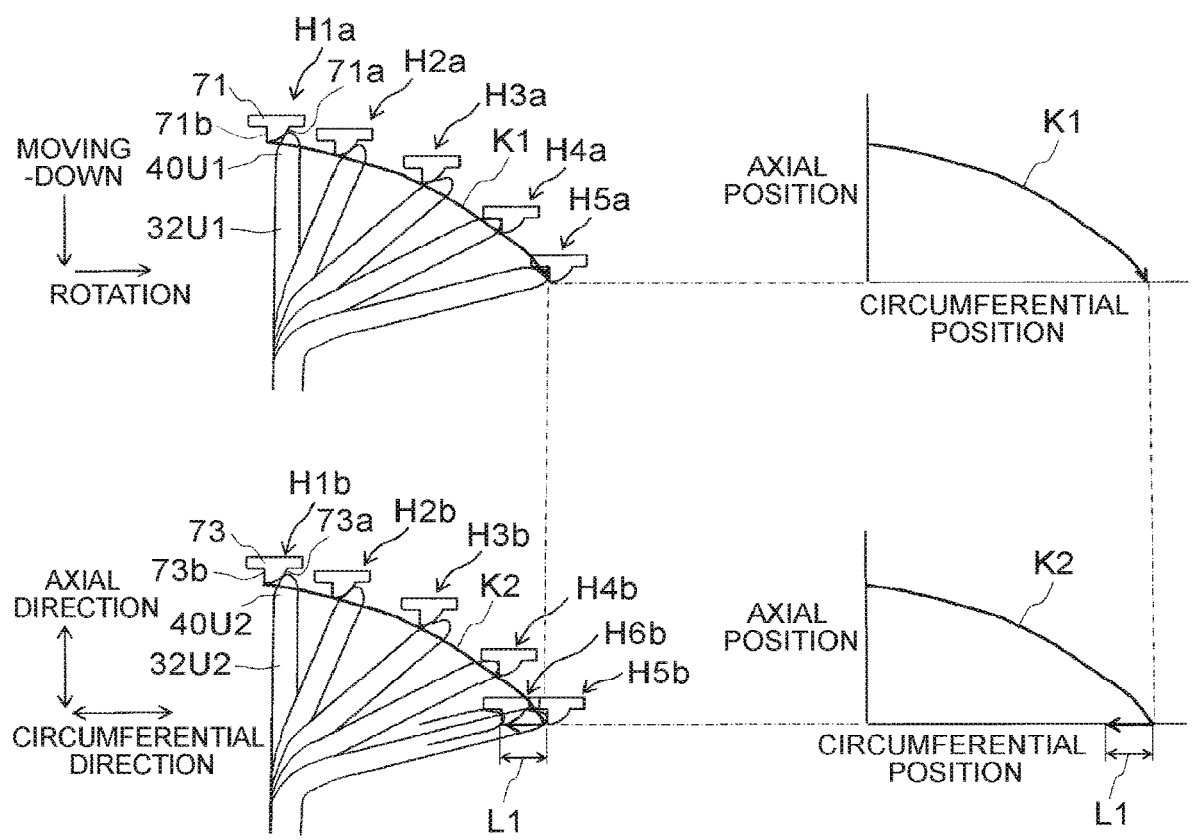
FIG. 9 is an explanatory view of an operation of the jig at the time when the conductor segments are bent.

This bending operation will be described with reference to FIG. 9. FIG. 9 illustrates the bending operation of the conductor segment 32U1 and the conductor segment 32U2 adjacent to the conductor segment 32U1. As illustrated in FIG. 9, the protrusion 71 is moved down and rotated from a position H1a where the protrusion 71 abuts with the tip end 40U1 of the conductor segment 32U1, such that the protrusion 71 moves through the position H1a, a position H2a, and a position H3a, so that the tilting surface 71a of the protrusion 71 presses the tip end 40U1 so as to press down (bend) the conductor segment 32U1. When the protrusion 71 moves to a position H4a, the tip end 40U1 is separated from the tilting surface 71a and abuts with the position defining surface 71b. Further, when the protrusion 71 moves from the position H4a to a position H1a, a position of the tip end 40U1 in the circumferential direction is defined by the position defining surface 71b of the protrusion 71. Note that a movement locus at the time when the protrusion 71 moves from the position H1a to the position H5a is indicated by a reference sign K1. Further, the movement locus K1 is extracted to be illustrated in a characteristic view.

In the meantime, in FIG. 9, similarly to the protrusion 71, the protrusion 73 presses down (bends) the conductor segment 32U2 in conjunction with the moving-down and rotating of the protrusion 71. That is, the protrusion 73 moves in a similar manner to the protrusion 71 from a position H1b to a position H5b. After the operation of the protrusion 71 is finished, the protrusion 73 rotates reversely from the position H5b to a position H6b. A reverse rotation angle is an angle corresponding to a distance L1. The distance L1 is the same distance as the distance L1 illustrated in FIG. 3. That is, the protrusion 73 pushes back the tip end 40U2 only by the distance L, so as to adjust a position of the tip end 40U2. Since the tip end 40U2 is pushed back by the distance L, the tip end 40U2 approaches the tip end 40U 1. Further, a movement locus at the time when the protrusion 73 moves from the position H1b to the position H6b is indicated by a reference sign K2, and the movement locus K2 is extracted to be illustrated in a characteristic view.

As apparent from a comparison between the movement locus K1 of the protrusion 71 and the movement locus K2 of the protrusion 73, the protrusion 73 reversely rotates independently from the protrusion 71 after the operation of the protrusion 71 is finished. Due to the reverse rotation, the tip end 40U2 is pushed back only by the distance L1 and approaches the tip end 40U1, as illustrated in FIG. 3. As a result, as illustrated in FIG. 4, a distance between the tip end 40U1 and the tip end 40U2 in the same phase is narrowed and a distance between the tip end 40U2 and the tip end 40V1 in different phases is widened, so that the relationship of the tip-end distance G1a>the tip-end distance G2a is established.

Further, another conductor segment 32U1 in the same phase to be joined to the tip end 40U1 of the conductor segment 32U1 is bent by another jig 64 in a reverse direction along the circumferential direction, so that the tip ends 40 of the conductor segments 32 in the same phase are placed at a position where they abut with each other. Other conductor segments 32V1, 32V2, 32 W1, 32W2 are also bent in the same manner.

In step S30, contacting parts between the tip ends 40U1 of the conductor segments 32U1 in the same phase are irradiated with laser so that those parts are welded to each other. Laser welding can perform heating locally, and therefore, even if the tip ends are placed closely, only desired tip ends 40U1 can be welded. As a result, the plurality of conductor segments 32U1 can be connected electrically. By welding the tip ends 40 of all the conductor segments 32, the stator coil 24 is finished.

As such, in the circumferential direction and in the axial direction, a distance between the tip ends 40 in the same phase can be narrowed and a distance between the tip ends 40 in different phases can be widened. Further, a creepage distance between the tip ends 40 in different phases can be also increased. As illustrated in FIG. 4, for example, a distance (a different-phase distance) in the circumferential direction and the axial direction between the tip end 40U2 and the tip end 40V1 in different phases can be made larger than a distance (a same-phase distance) between the tip end 40U1 and the tip end 40U2 in the same phase. This makes it possible to improve an insulating property of the tip ends 40 in different phases between which a potential difference is large. As a result, it is not necessary to coat the tip ends 40 with the insulation resin, which does not require an insulation step of the tip ends 40, thereby making it possible to restrain an increase in cost.

Further, similarly to the tip ends 40, in the circumferential direction and in the axial direction, a distance between the conductor segments 32 in the same phase can be narrowed and a distance between the conductor segments 32 in different phases can be widened. This makes it possible to improve an insulating property between the conductor segments 32 in different phases. Further, the coating of the insulation resin that coats the conductor segments 32 can be reduced in thickness, thereby making it possible to reduce a used amount of the insulation resin.

Further, the tip ends 40 intersecting at the time when the linear parts 50 of the conductor segments 32 are bent are welded by laser, thereby making it is possible to shorten a length of the stator 20 in the axial direction. This consequently makes it possible to downsize the stator 20 while securing the insulating property of the tip ends 40 and the conductor segments 32.

Further, by bending the conductor segments 32 by the bending device 60 using the jig 64, it is possible to manufacture, in a single step, a segment coil in which the distance between the tip ends 40 in the same phase is small and the distance between the tip end 40 in different phases is large. On this account, it is possible to manufacture the stator 20 having an improved insulating property of the tip ends 40 with manufacture efficiency at a restrained manufacturing cost.

Figure 10:
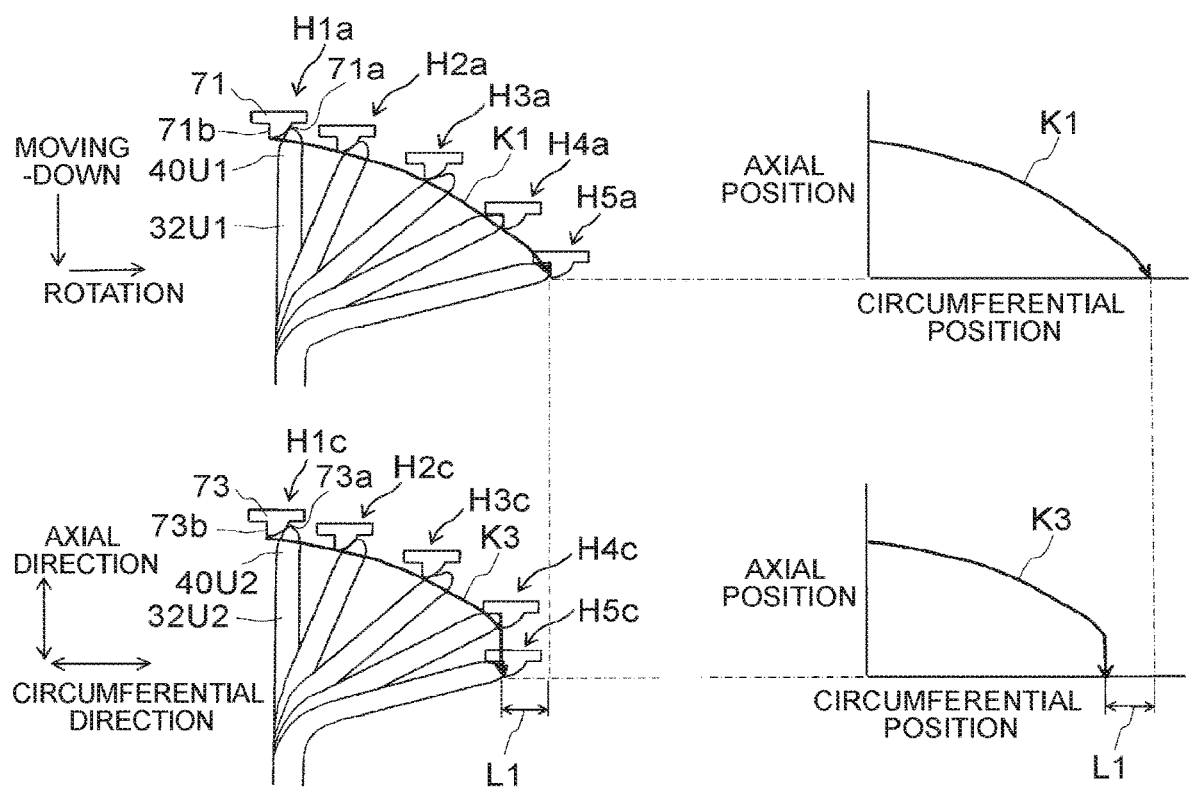
FIG. 10 is another explanatory view of an operation of the jig at the time when the conductor segments are bent.

Next will be described another bending operation of the conductor segments 32 with reference to FIG. 10. Similarly to FIG. 9, FIG. 10 illustrates a bending operation of the conductor segment 32U1 and the conductor segment 32U2 adjacent to the conductor segment 32U1. In FIG. 10, a bending operation of the conductor segment 32U1 is the same as the bending operation of the conductor segment 32U1 illustrated in FIG. 9, and therefore, a description thereof is omitted. With reference to FIG. 10, a bending operation of the conductor segment 32U2 by the protrusion 73 will be described.

In FIG. 10, similarly to the protrusion 71, the protrusion 73 presses down (bends) the conductor segment 32U2 in conjunction with the moving-down and rotating of the protrusion 71. In the bending operation, an operation from a position H1c to a position H4c is the same as the operation from the position H1b to the position H4b illustrated in FIG. 9.

The protrusion 73 stops a rotative motion at the position H4c and stays at the position H4c. A moving-down operation is kept performed, so that the protrusion 73 moves from the position H4c to a position H5c along the axial direction. At the position H4c, the tip end 40U2 abuts with the position defining surface 73b of the protrusion 73, so that the tip end 40U2 moves to the position H5c together with the protrusion 73.

The position H4c and the position H5c are a position short from the position H5a in the circumferential direction only by a distance L, and this distance L1 is the same distance as the distance L1 illustrated in FIG. 3. That is, the tip end 40U2 stays at a position short from the tip end 40U1 only by the distance L1. Because of this, the tip end 40U2 approaches the tip end 40U1. Further, a movement locus at the time when the protrusion 73 moves from the position H1c to the position H5c is indicated by a reference sign K3, and the movement locus K3 is extracted to be illustrated in a characteristic view.

As apparent from a comparison between the movement locus K1 of the protrusion 71 and the movement locus K3 of the protrusion 73, the protrusion 73 stops rotating during the rotation, so that its movement in the circumferential direction is stopped and the protrusion 73 stays at this position. Since the protrusion 73 stays, the tip end 40U2 stays at a position short from the tip end 40U1 only by the distance L1 and approaches the tip end 40U1 as illustrated in FIG. 3. As a result, as illustrated in FIG. 4, the distance between the tip end 40U1 and the tip end 40U2 in the same phase is narrowed and the distance between the tip end 40U2 and the tip end 40V1 in different phases is widened, so that the relationship of the tip-end distance G1a>the tip-end distance G2a is established.

Even by such a bending operation of the conductor segments 32, the distance between the tip ends 40 in the same phase can be narrowed and the distance between the tip ends 40 in different phases can be widened in the circumferential direction and in the axial direction. For example, as illustrated in FIG. 4, the distance (the different-phase distance) in the circumferential direction and the axial direction between the tip end 40U2 and the tip end 40V1 in different phases can be made larger than the distance (the same-phase distance) between the tip end 40U1 and the tip end 40U2.

Note that the configuration in which intersecting parts that intersect with each other at the time when the conductor segments 32 are bent are joined by welding has been described, but the configuration of the present disclosure can be also applied to a configuration in which linear parts obtained by axially extending the conductor segments 32 from the intersecting parts are joined by welding.

What is claimed is:

1. A manufacturing apparatus for a stator of a rotary electric machine, the manufacturing apparatus comprising:

a jig configured to bend, in a stator-core circumferential direction, conductor segments projecting from stator-core axial end surfaces of slots of a stator core, wherein the jig includes (i) a first jig configured to bend one conductor segment of the conductor segments in a same phase and adjacent to each other in the stator-core circumferential direction, and (ii) a second jig configured to bend an other conductor segment of the conductor segments, wherein the second jig is configured to bend the other conductor segment at a same time as when the first jig bends the one conductor segment such that a tip end of the other conductor segment approaches a tip end of the one conductor segment;

wherein a width of the first jig in a circumferential direction is longer than a width of the second jig in the circumferential direction.

2. The manufacturing apparatus according to claim 1, wherein the second jig is movable in a circumferential direction independently of the first jig.

3. The manufacturing apparatus according to claim 1, wherein the first jig includes a first protrusion configured to contact the tip end of the one conductor segment and the second jig includes a second protrusion configured to contact the tip end of the other conductor segment, and wherein the first protrusion and the second protrusion have an annular shape.

4. The manufacturing apparatus according to claim 1, wherein the first jig and the second jig overlap with each other in the circumferential direction and an axial direction, and wherein the first jig and the second jig do no overlap with each other in a radial direction.

* * * * *